United States Patent [19]

Luvinh

[11] Patent Number: 4,994,516

[45] Date of Patent: Feb. 19, 1991

[54] PETROLEUM RESINS AND THEIR PRODUCTION

[75] Inventor: Quoc Luvinh, Brussels, Belgium

[73] Assignee: Exxon Research & Engineering Company, Florham Park, N.J.

[21] Appl. No.: 332,858

[22] Filed: Apr. 3, 1989

Related U.S. Application Data

[60] Division of Ser. No. 4,298, Jan. 7, 1987, Pat. No. 4,824,921, which is a continuation of Ser. No. 623,108, Jun. 22, 1984, abandoned.

[30] Foreign Application Priority Data

Jun. 28, 1983 [GB] United Kingdom ............... 8317510

[51] Int. Cl.$^5$ .............................................. C08L 91/06
[52] U.S. Cl. .................................. 524/275; 524/277; 524/488; 524/489; 524/487
[58] Field of Search ............... 524/275, 277, 487, 488, 524/489

[56] References Cited

U.S. PATENT DOCUMENTS

| | | | |
|---|---|---|---|
| 4,022,723 | 5/1977 | Hokama et al. | 260/4 AR |
| 4,105,611 | 8/1978 | Orth, Jr. | 524/489 |
| 4,156,762 | 5/1979 | Kudo et al. | 526/76 |
| 4,581,392 | 4/1986 | Armstrong et al. | 524/488 |
| 4,772,650 | 9/1988 | Ou-Yang | 524/489 |

FOREIGN PATENT DOCUMENTS

| | | |
|---|---|---|
| 0013060 | 7/1980 | European Pat. Off. . |
| 2368504 | 10/1977 | France . |
| 7430489 | 7/1972 | Japan . |
| 50-1598 | 1/1975 | Japan . |
| 1537852 | 1/1979 | United Kingdom . |
| 1538057 | 1/1979 | United Kingdom . |
| 2032442 | 5/1980 | United Kingdom . |

*Primary Examiner*—Lewis T. Jacobs
*Assistant Examiner*—Karen A. Hellender
*Attorney, Agent, or Firm*—John F. Hunt; T. Dean Simmons

[57] ABSTRACT

Hot melt adhesives comprising ethylene/vinyl acetate copolymer, wax, and a resin containing 5 to 80 wt. % of units derived from olefinically unsaturated aromatic compounds, 5 to 80 wt. % of units derived from $C_5$ or $C_6$ olefines or diolefines or a mixture thereof, and from 7 to 45% of units derived from a terpene. The hot melt adhesive composition has improved color and compatibility over ethylene/vinyl acetate copolymer and wax blends containing resins of significant portions of cyclopentadiene or dicyclopentadiene. The hot melt adhesive of the invention also show improved adhesive properties on substrate such as glass and aluminum.

13 Claims, No Drawings

PETROLEUM RESINS AND THEIR PRODUCTION

This is a division of application Ser. No. 004,298, filed Jan. 7, 1987, U.S. Pat. No. 4,824,921, which is a file wrapper continuation of U.S. Ser. No. 623,108, filed Jun. 22, 1984, now abandoned.

The present invention relates to new improved petroleum resins and their production. In particular the invention relates to resins suitable as tackifiers for adhesive formulations particularly hot melt adhesives, hot melt pressure sensitive adhesives and solvent based pressure sensitive adhesives.

Petroleum resins obtained by polymerization of $C_5$ dienes such as pentadiene 1,3 and/or isoprene are well known as is their use as components in hot melt formulations, however there is a need to improve the adhesive properties of such hot melts particularly when applied to substrates traditionally difficult to adhere to such as glass and polyethylene.

Previous techniques have been proposed to improve the adhesive properties of resins by controlling molecular weight during polymerization such as adding branched olefines, alkyl aromatics and alkyl halides to the polymerization, see for example United Kingdom Patents 1538057 and 1537852.

One disadvantage of these earlier techniques is that the presence of the molecular weight controlling additive tends to reduce the softening point of the resin thus rendering it unsuitable for certain adhesives in addition they tend to impair the compatibility of the resin with the ethylene/vinyl acetate copolymer and wax normally present in hot melt adhesive systems.

It has been proposed in Japanese patent application 7430489 to include α-pinene for copolymerization with petroleum resin feeds and French Patent 2368504 suggests the inclusion of vinyl-norbornene or tetrahydroindene. It has also been proposed in United Kingdom Patent 2032442 that limonene may be copolymerised with $C_5$ olefine and diolefine feeds and European Patent 0013060 proposes that carene may be copolymerised with $C_5$ olefine and diolefine feeds. These patents also make passing reference to the fact that unsaturated aromatics such as styrene or para-methyl styrene may be included.

In order for a resin to be useful as a tackifier in adhesive systems it is necessary that it has the required softening point consistent with the necessary adhesive properties and also good compatibility with the other components of the adhesive system.

The other component depends upon the use to which the adhesive is to be put, but for hot melt adhesives with which the present invention is particularly concerned the other component is frequently an ethylene/vinyl acetate copolymer.

We have now found that a particularly desirable combination of properties may be achieved by the copolymerisation of a certain amount of a $C_5$ olefine and/or diolefine and/or $C_6$ olefine and/or diolefine feed, a terpene and an unsaturated aromatic compound providing that the mixture copolymerised is substantially free from cyclopentadiene. This is in contrast to U.S. Pat. No. 3,478,005 which suggests the production of resins from feeds containing significant amounts of cyclopentadiene which we find deleteriously affects the properties of the resin.

The present invention provides a process for the production of petroleum resins comprising copolymerising using a Friedel Crafts catalyst a mixture of:
(i) 4 to 80 wt. % of a feed comprising $C_5$ olefines and/or diolefines, and/or $C_6$ olefines and/or diolefines or a mixture of $C_5$ and $C_6$ olefines and/or diolefines,
(ii) 5 to 55 wt. % of a terpene and
(iii) 3 to 55 wt. % of an olefinically unsaturated aromatic compound
said mixture containing less than 2 wt. % of cyclopentadiene or dicylopentadiene.

The $C_5$ and/or $C_6$ diolefine and/or olefine containing feed used in the process may be obtained from the cracking of petroleum feedstock: Such feedstocks include naphthas, kerosene, gas oil and vacuum gas oil. These feedstocks usually boil in a range of from 20° C. to 550° C.

The petroleum feedstock is cracked, preferably in the presence of steam, and the recommended cracking temperature is between 500° and 870° C. The product which contains unsaturated hydrocarbons usually boiling in the range of 20° to 240° C., preferably 20° to 130° C., generally is thereafter subjected to fractionation to remove $C_2$ to $C_4$ light ends. If the feedstock contains large amounts of cyclopentadiene it should be subjected to thermal soaking at a temperature between 100° C. and 160° C., preferably 120° to 140° C., e.g. at about 130° C. The thermal soaking preferably takes 0.5 to 6 hours, e.g. 0.5 to 3 hours to reduce the level of cyclopentadiene or dicyclopentadiene to below 2 wt. %. Low temperature heat soaking is preferred in order to limit the cyclic diene (Cylopentadiene and Methylcyclopentadiene) co-dimerisation with $C_5$ linear conjugated dienes (isoprene and pentadienes 1,3 cis- and trans-). After fractionation and, if carried out, thermal soaking, the feedstock is preferably subjected to distillation to remove cyclic conjugated diolefines which are gel precursors (cyclopentadiene and methylcyclopentadiene being removed as dimers).

After distillation one obtains an overhead naphtha which usually boils in the range from 15° to 110° C., e.g. 25° to 80° C., the best results being achieved with a 25°–70° C. cut. This overhead naphtha comprises mainly $C_5$ diolefines such as isoprene and 1,3 cis-and trans- pentadienes (piperylene), $C_5$ to $C_6$ monoolefines and aromatics for example benzene. In general the overhead naphthas have the following compositions:

|  | % by weight |
| --- | --- |
| Total paraffins | 1.0 to 41.5 |
| Total diolefines | 50.0 to 14.5 |
| Total olefines | 33.5 to 13.0 |
| Total aromatics | 20.0 to 35.0 |
| Isoprene | 16.5 to 6.5 |
| Pentadiene 1,3 | 15.5 to 4.5 |

The exact composition, depending on the nature of the petroleum feedstock, which is subjected to steam cracking. Cyclopentene contents are generally below 3.0 wt. %. These feeds contain materials such as paraffins and aromatics which are not polymerized during the process of the invention and it is emphasised that these materials are not considered to be part of the reaction mixture for the purposes of this invention.

The feed could be significantly isoprene free provided this compound is previously recovered through any conventional separation process such as distillation, extractive distillation or azeotropic distillation. In this case the feed may be a narrow fraction pentadiene 1,3 concentrate. A typical such composition contains less than 5 wt. % preferably less than 2 wt. % isoprene, from 25 to 80 wt. % pentadiene 1,3 (cis and trans isomer). Other $C_5$ and/or $C_6$ olefines, and/or diolefines making up the remainders generally cyclopentene typically 75 to 10 wt. %.

The $C_5/C_6$ feed comprises 4 to 80 wt. % preferably 5 to 55 wt. % of the total unsaturated materials in the process of the present invention. We prefer to use from 10 to 30 wt. % of this feed.

The terpene feed used in the present invention may be α-pinene, β-pinene, carene, limonene or other readily available terpinous materials, alpha pinene and limonene being preferred. The material may be pure or the commercially available concentrates such as gum terpentine or alpha pinene concentrates may be used which tend to be mixtures of various terpinous materials. For example a suitable feed contains from about 70 to 90 wt. % alpha pinene the remainder being other terpenes. Limonene streams are available containing above 50 wt. % generally 50 to 70 wt. % limonene and carene streams are available containing from 50 to 85 wt. % Δ-3 carene. These are typical streams useful in the present invention. Where limonene is used it is preferred that the $C_5/C_6$ unsaturated feed contain a high proportion of olefines since if large amounts of diolefines are present the molecular weight of the product tends to be too high with reduction in adhesive properties and compatibility preferably the $C_5/C_6$ feed contains at least 10 wt. % more preferably at least 20 wt. % of olefines. We prefer to use from 15 to 35 wt. % of the terpene.

The olefinically unsaturated aromatic compounds useful in the present invention may also be used in its pure form or as mixtures of unsaturated aromatics such as those available from the cracking of petroleum materials. Examples of suitable unsaturated aromatics include styrene, alpha methyl styrene, indene and vinyl toluene and mixtures thereof. Here again where mixtures are used reference to the percentage is to the amount of unsaturated polymerizable aromatic material based on the total weight of unsaturated material fed to the reactor. We prefer to use from 10 to 45 wt. % of the unsaturated aromatic compound.

We have found that using the three ingredients of the stream in the proportions proposed leads to significantly improved resin properties. When unsaturated aromatics such as styrene are copolymerised with $C_5$ feeds the result is an undesirable lowering of the softening point of the resin even although an improvement in adhesive properties is achieved. We have found however that if the terpene is also included the improvement in the adhesive properties may be retained without the dramatic reduction in softening point. Such improved adhesion has been found to enable the tackification of hitherto difficult to tackify rubbers such as the commercially available product Cariflex (Registered Trade Mark) 1011 and to result in improved adhesive properties in hot melt adhesives containing ethylene vinyl acetate copolymers and wax on substrates such as glass and aluminium together with improved compatibility with the other components of the hot melt adhesive system.

In addition the resins of the present invention have been found to have low colour and good heat stability. Further the process has a high yield, above 40 wt. % and sometimes a high as 75 wt. % or higher.

Agents to narrow the molecular weight distribution may be employed in the present invention for example the branched chain reactive aliphatic olefines of our GB patent 1538057 may be used to achieve narrow distribution. These olefines may make up part of the $C_5/C_6$ feed and the ratios of the amount of feed to the amount of branched olefine used may be varied to obtain resins of any desired softening point within the range 60° C. to 140° C. Where branched olefines are used a broad (e.g. $C_5$-$C_8$) fraction of our U.K. patent 1538057 may be used. The preferred branched chain reactive aliphatic olefines are oligomers of propylene and butylenes obtained with phosphoric acid catalysts or from a Fluid Catalytic Cracker.

Other chain transfer agents such as the alkyl halides or our U.K. Patent 1537852 may also be used optionally as part of the catalyst system.

Similarly, oxygenated transfer agents may be used such as mono-, di- or tri-substituted phenols the substituent being a $C_1$ to $C_{30}$ or preferably $C_1$ to $C_6$ straight chain or branched chain hydrocarbyl group e.g. methyl, ethyl, propyl, butyl, amyl or their secondary or tertiary isomers (e.g. 2,6 ditertiary-butyl-4-methyl phenol), alcohols, esters, dialkyl ethers, alkaryl ethers, the alkyl group in the ether being $C_1$ to $C_6$ straight or branched chain hydrocarbyl group e.g. methyl, ethyl, amyl or their secondary or tertiary isomers, (e.g. anisole), organic acids or anhydrides (e.g. maleic anhydride). When used the oxygenated transfer agent should preferably have a boiling point lower than 300° C. If low boiling point compounds e.g. diethyl ether, are used the polymerization temperature and pressure should be carefully chosen so as to maintain them in the liquid state.

The most efficient compounds in the presence of $AlCl_3$ are dialkyl ethers or an alkaryl ether, such as anisole since they act as solvents for the catalysts. Since the polymerization is usually carried out between 30° to 80° C., any such additive should be of adequate boiling point in order to maintain it in the liquid phase.

The amount of oxygenated compound used as transfer agent can vary from 0.1 to 5 wt. %, preferably 0.5 to 2 wt. %, based on the weight of petroleum resin feed. They are generally less attractive than the branched chain reactive aliphatic olefines previously described.

The feeds are mixed and polymerized using a Friedel Crafts catalyst, for example aluminium chloride, aluminium bromide or an aluminium chloride/hydrochloric acid/aromatic hydrocarbon complex or aluminium chloride/alkyl halide/aromatic hydrocarbon complex, the aromatic hydrocarbon being preferably alkyl substituted for example 0-xylene, mesitylene, ethyl benzene, isopropyl benzene and other short or long chain mono-, di- or tri- alkyl benzenes are especially suitable. The alkyl chain can be linear or branched and can vary from 1 to 30 carbon atoms.

Acid liquid $AlCl_3$ sludges obtained as by-products during the alkylation of benzene or any other substituted aromatics (e.g. toluene or xylenes) with branched chain olefins can be directly used as a catalyst for the above described polymerization process. The branched chain olefins which are for example, produced via the boron trifluoride oligomerisation of propylene and fractionation, e.g. $C_{12}$ olefins or $C_{24}$ olefins, can be alkylated with aromatics producing in situ sludge. As an example the acidic sludge available from a dodecylbenzene plant provided similar results to the preformed O-xylene AlCl$_3$/HCl liquid complex sludges from other substituted branched or straight chain aromatic production for example, meta and/or para diisopropyl benzenes and para-tertiary butyl benzene may also be used.

These liquid complexes are slightly more efficient than AlCl$_3$ powder at equivalent concentration and provide slightly higher resin yields and lower resin molecular weight.

In the polymerization process the amount of catalyst may vary from 0.25 to 3.0 wt. % preferably 0.5 to 1.5 wt. % based on the weight of the mixture to be polymerized. The optimum concentration depends on the nature of the solvent which affects the solubility of the catalyst as well as on the stirring efficiency inside the polymerization reactor.

Other Friedel Crafts catalysts like titanium tri- or tetrachloride, tin tetrachloride, boron trifluoride, boron trifluoride complexes with organic ethers, phenols or acids can also be used, but they lead to rather low resin yields and large quantities of liquid oligomers of low value are obtained. Even though these oily oligomers can be upgraded as reactive plasticizer or liquid plasticizer such catalysts are not recommended. Other possible catalysts can be acidic clays.

Usual polymerization temperatures are between −20° C. and 100° C., preferably between 30° and 80° C., we find that if lower temperatures are used the resin colour is improved although there can be a reduction in yield.

After polymerization the residual catalyst may be removed by, for example washing with aqueous solution of alkali, ammonia or sodium carbonate, or by the addition of an alcohol such as methanol and subsequent filtration.

The final resin may be stripped of unreacted hydrocarbons ("raffinate" rich in benzene and/or paraffins/unreactive olefins) and low molecular weight oligomers by stream stripping or vacuum distillation. The finished resin usually has a softening point of from 60° C. to 120° C., preferably 70° to 110° C.

The process of the present invention results in a mixture of the desired resin and undesirable material known as fill which can amount to as much as 25% of the production. The conversion of the various components to useful resin varies and hence the composition of the resin obtained may not correspond to the proportions of the components present in the polymerization reaction, for example whilst the conversion of the olefinically unsaturated aromatic feed may be virtually complete that of the terpene may be lower whilst that of the C$_5$/C$_6$ feed significantly lower still. We have found, however, that providing the proportions specified are polymerized according to the process of the present invention, resins having the improvement in properties described are obtained. The resins obtained generally contain from 5–80 wt. % of units derived from the olefinically unsaturated aromatic, from 5 to 80 wt. % of units derived from the C$_5$ olefine and/or diolefine and/or C$_6$ olefine and/or diolefine or mixtures of C$_5$ and C$_6$ olefines and/or diolefines and 7 to 45 wt. % of units derived from the terpene.

The present invention therefore provides a resin comprising a copolymer containing from 5 to 80 wt. % of units derived from an olefinically unsaturated aromatic compound from 5 to 80 wt. % of units derived from C$_5$ olefines and/or diolefines and/or C$_6$ olefines and/or diolefines or a mixture of C$_5$ and C$_6$ olefines and/or diolefines and from 7 to 45 wt. % of units derived from a terpene.

The amount of unsaturated aromatic present may readily be determined by proton NMR although it is difficult to determine accurately the exact amount of the other two components present.

For optimum use in hot melt adhesive formulations we prefer that the resins have a softening point in the range 75° C. to 115° C. preferably 90° C.–105° C. and have a molecular weight of from 500 to 1500 as measured by GPC.

The resins obtained can be used in many applications which require low viscosity good flexibility and elongation before or especially after chemical modification with polar compounds such as phenols, unsaturated anhydrides such as maleic anhydride or unsaturated acids (e.g. fumaric acid). These resins are designed for a wide range of end uses and applications. They can be applied to paper, metal, thermo-plastic films Cellophane (Registered Trade Mark), polyester, PVC, woven or non woven fabrics, glass etc. and for bonding such materials together. Typical applications are hot melts, carpet backing, coating with drying oil formulations, book binding, paper sizing or in any applications involving natural or synthetic resins and/or rubbers such as caulks, sealants or rubber tackification. More especially they may be used as tackifiers with natural rubber or synthetic resins and/or rubbers such as caulks, sealants or rubber tackification. More especially they may be used as tackifiers with natural rubber or synthetic rubbers such as polyisoprene, EPDM, butyl, chorobutyl, bromobutyl, neoprene and block copolymers for example styrene/isoprene rubber (Shell Cariflex (Registered Trade Mark) TR1107) mixtures of such rubbers.

Other applications involving such resin properties are pressure sensitive adhesives, hot melt adhesives, hot melt pressure sensitive adhesives, low temperature adhesives, label adhesives, latex adhesives, surgical tapes and masking tapes where they may be blended with polymers such as ethylene/vinyl acetate copolymers and optionally with wax.

The present invention therefore further provides the use as a component in an adhesive formulation of a resin which is a copolymer containing from 5 to 80 wt. % of units derived from an olefinically unsaturated aromatic compound from 5 to 80 wt. % of units derived from C$_5$ olefines and/or diolefines and/or C$_6$ olefines and/or diolefines or a mixture of C$_5$ and C$_6$ olefines and/or diolefines and from 7 to 45 wt. % of units derived from a terpene.

In particular the present invention provides a hot melt adhesive comprising
(i) an ethylene vinyl acetate copolymer
(ii) wax and
(iii) a resin which is a copolymer containing from 5 to 80 wt. % of units derived from an olefinically unsaturated aromatic compound
from 5 to 80 wt. % of units derived from C$_5$ olefines and/or diolefines and/or C$_6$ olefines and/or diolefines or a mixture of C$_5$ and C$_6$ olefines and/or diolefines and from 7 to 45 wt. % of units derived from a terpene.

The present invention is illustrated but in no way limited by reference to the following examples in which the following feeds were used:

| wt. % | |
|---|---|
| α-pinene | 90.34 |
| Camphene | 4.19 |
| β-pinene | 0.21 |
| Δ3 carene | 0.11 |
| α-terpinene | 0.67 |
| p-cymene | 0 |
| Limonene | 2 |
| γ-terpinene | 0.34 |
| Terpinolene | 0.87 |
| 2,4,8-mentadiene | 0.11 |
| Unknown | 1.16 |
| Total polymerizable | 98.84 |

Carene Concentrate
G.C. Analysis of Carene concentrate

| wt. % | |
|---|---|
| α-pinene | 4.01 |
| Camphene | 1.67 |
| β-pinene | 12.36 |
| Δ3 Carene | 60.82 |
| γ-terpinene | 1.57 |
| p-cymene | 1.73 |
| Limonene | 9.05 |
| γ-terpinene | 0.76 |
| Terpinolene | 1.75 |
| 2,4,8-mentadiene | 0.16 |

Piperylene Concentrate
Initial Boiling Point 270° C.

| Isoprene | 1.17 |
|---|---|
| Pentene-2 trans. | 1.6 |
| Penetene-2 cis. | 3.45 |
| 2 Me-butene-2 | 3.59 |
| Pentadiene 1,3 trans. | 43.36 |
| CPD | 0.59 |

-continued

Piperylene Concentrate
Initial Boiling Point 270° C.

| Pentadiene 1,3 cis. | 23.55 |
|---|---|
| 1,2 dimethylbutane | 0.38 |
| Cyclopentene | 14.99 |
| 4 methylpentene-1 <br> 3 methylpentene-1 | 0.56 |
| 3 methylpentadiene 1,4 <br> 4 methylpentadiene-2 cis. <br> 2,3 dimethylbutene-1 | 0.17 |
| Cyclopentane | 1.58 |
| 4 methylpentene 2t | 0.06 |
| 2 methylpentane | 0.22 |
| 2 methylpentene-1 | 0.01 |
| 3 methylpentane | 0.03 |

The concentrates described above were mixed with pure styrene and a paraffinic solvent in the proportions set out in the following Table 1. The mixture was then polymerised at 60° C. using 1 wt. % AlCl₃ as catalyst. The conditions used were as follows:

The reaction mixture (as described in Table 1) was fed to a 2 liters glass reactor which was fitted with a mechanical stirrer, a cooler and a catalyst injection device. 1 wt. % of powdered AlCl₃ as catalyst based on the total weight of the feed was injected into the reactor which was then held at 50°-60° C. for 90 minutes. An ammonia solution was added to stop the reaction after the desired reaction time. The resin was then obtained after steam stripping at 250° C. under nitrogen atmosphere. The solvent used contains:

| paraffins | >97 wt. % |
|---|---|
| aromatics | 0.5 wt. % |
| diolefins, olefins | balance |

The properties of the resins obtained and their adhesive properties are also set out in Table 1.

TABLE 1

| EXPERIMENT | 1 | 2 | 3 | 4 | 5 | 6 | 7 | 8 | 9 | 10 |
|---|---|---|---|---|---|---|---|---|---|---|
| Feed Composition | | | | | | | | | | |
| Carene conc. | | | | | | | | | | |
| Piperylene conc. | 27.7 | 28.5 | 23.8 | 19 | 12.5 | 30.7 | 24.3 | 38 | 10 | 19 |
| Alpha pinene conc. | 32.3 | 31.5 | 26.2 | 31 | 37.5 | 25 | 25.2 | 31 | 31 | 21 |
| Styrene | 10 | 15 | 25 | 30 | 30 | 24.3 | 30.5 | 15 | 45 | 45 |
| Solvent | 30 | 25 | 25 | 20 | 20 | 20 | 20 | 16 | 14 | 15 |
| Total polymerizable | 68.24 | 73.21 | 73.51 | 78.7 | 78.94 | 78.18 | 78.5 | 81.7 | 85.14 | 83.81 |
| Cyclopentadiene | 0.24 | 0.23 | 0.19 | 0.14 | 0.1 | 0.24 | 0.19 | 0.28 | 0.07 | 0.14 |
| Resin Properties | | | | | | | | | | |
| Resin yield | 43.6 | 50.2 | 55 | 61.2 | 55.1 | 61 | 63.6 | 60.6 | 66.2 | 74.6 |
| Fill yield | 16.6 | 15.8 | 12 | 10 | 10 | 6.3 | 9.4 | 5.5 | 5.3 | 5.2 |
| Styrene content NMR | 21.6 | 28 | 38.8 | 47.3 | 50 | 37.5 | 44.7 | | | |
| Soft. point (°C.) | 108.5 | 104 | 96.5 | 95.5 | 97 | 97 | 94 | 102.5 | 92 | 91 |
| Gardner colour | 3⁻ | 3/3+ | 2 | 2⁻ | 2⁻ | 3⁻ | 3⁻ | 2⁻ | | 2⁻ |
| Wax cloud point <br> EVA 250/resin/microwax <br> 30/45/25 | 89 | 90 | 90 | 82 | 88 | 89 | 87 | 87 | 86 | 87 |
| $M_n$ | 1180 | 970 | 890 | 770 | 735 | | 740 | | 660 | 705 |
| $M_w$ | 4075 | 3620 | 3240 | 2855 | 2150 | | 2900 | | 2250 | 3085 |
| $M_w/M_n$ | 3.46 | 3.73 | 3.65 | 3.73 | 2.93 | | 3.93 | | 3.4 | 4.37 |
| Adhesive Properties | | | | | | | | | | |
| Hot Melt Properties | | | | | | | | | | |
| Wax Cloud Point | | 60 | 64 | 60 | 65 | | | | 62 | 65 |
| Viscosity at 180° C. (cps) | | 1470 | 15250 | 14740 | 13200 | | · | | 13450 | 13300 |
| T-Peel (gr/cm) | | | | | | | | | | |
| on polyethylene | | 380 | 340 | 415 | 470 | | | | 425 | 400 |
| on Aluminum | | 295 | 960 | 1020 | 1110 | | | | 1090 | 1140 |
| open time (sec) | | >30 | >30 | >30 | | | | | | |
| setting time (sec) | | 0.8 | 0.8 | 0.8 | | | | | | |
| Heat stability at 180° C. | | | | | | | | | | |
| Colour initial | | | | | | | | | | |

TABLE 1-continued

|  |  |  |  |  |  |  |  |
|---|---|---|---|---|---|---|---|
| 2 hrs | 3 | 6 | 6 | 5 |  | 5 | 6 |
| 25 hrs | 13 | 12 | 12 | 12 |  | 11 | 12 |
| 50 hrs | 14 | 14 | 14 | 15 |  | 14 | 14 |
| Skinning (%) |  |  |  |  |  |  |  |
| 2 hrs | 0 | 0 | 0 | 0 |  | 0 | 0 |
| 25 hrs | 40 | 100 | 100 | 70 |  | 60 | 70 |
| 50 hrs | 50 | 100 | 100 | 100 |  | 60 | 90 |
| Viscosity after 50 hrs | 14625 | 14950 | 14000 | 13400 |  | 13100 | 13250 |
| Mechanical Properties |  |  |  |  |  |  |  |
| Elongation (%) | 865 | 915 | 800 | 720 |  | 800 | 875 |
| Tensile strength (gr/mm2) | 710 | 730 | 690 | 570 |  | 600 | 580 |

| EXPERIMENT | 11 | 12 | 13 | 14 | 15 | 16 | 17 |
|---|---|---|---|---|---|---|---|
| Feed Composition |  |  |  |  |  |  |  |
| Carene conc. |  |  |  |  | 15.5 | 9.3 | 3.1 |
| Piperylene conc. | 10 | 29 | 14.5 | 19 | 19 | 19 | 19 |
| Alpha pinene conc. | 41 | 21 | 31.2 | 31* | 15.5 | 21.7 | 27.9 |
| Styrene | 30 | 30 | 34.3 | 30 | 30 | 30 | 30 |
| Solvent | 19 | 20 | 20 | 20 | 20 | 20 | 20 |
| Total polymerizable | 80.02 | 78.31 | 79.21 |  |  |  |  |
| Cyclopentadiene | 0.08 | 0.22 | 0.11 |  |  |  |  |
| Resin Properties |  |  |  |  |  |  |  |
| Resin yield | 53.6 | 64.5 | 60 | 75.9 | 60.8 | 60 | 59.9 |
| Fill yield | 20.4 | 7.2 | 7 | 2.5 | 12.5 | 11.8 | 12.2 |
| Styrene content NMR |  |  |  |  | + |  | + |
| Soft. point (°C.) | 100 | 94 | 94 | 101.5 | 94 | 93 | 95 |
| Gardner colour | 3⁻ | 2.5/3⁻ | 2.5/3⁻ | 3+ | 3+ | 3+ | 3+ |
| Wax cloud point |  |  |  |  |  |  |  |
| EVA 250/resin/microwax 30/45/25 | 85 | 86 | 86 | 86 | 86 | 87 | 87 |
| $M_n$ | 770 | 795 |  |  |  |  |  |
| $M_w$ | 2185 | 3845 |  |  |  |  |  |
| $M_w/M_n$ | 2.83 | 4.83 |  |  |  |  |  |
| Adhesive Properties |  |  |  |  |  |  |  |
| Hot Melt Properties |  |  |  |  |  |  |  |
| Wax Cloud Point | 65 | 65 |  |  | 63 |  | 63 |
| Viscosity at 180° C. (cps) | 13500 | 13350 |  |  | 13000 |  | 12000 |
| T-Peel (gr/cm) |  |  |  |  |  |  |  |
| on polyethylene | 390 | 350 |  |  | 440 | — | 400 |
| on Aluminum | 1110 | 1110 |  |  | 1120 | — | 1135 |
| open time (sec) |  |  |  |  |  |  |  |
| setting time (sec) |  |  |  |  |  |  |  |
| Heat stability at 180° C. |  |  |  |  |  |  |  |
| Colour initial |  |  |  |  |  |  |  |
| 2 hrs | 5 | 4 |  |  | 5 |  | 5 |
| 25 hrs | 12 | 11 |  |  | 12 |  | 12 |
| 50 hrs | 15 | 13 |  |  | 15 |  | 15 |
| Skinning (%) |  |  |  |  |  |  |  |
| 2 hrs | 0 | 0 |  |  | 0 |  | 0 |
| 25 hrs | 15 | 50 |  |  | 10 |  | 60 |
| 50 hrs | 35 | 50 |  |  | 25 |  |  |
| Viscosity after 50 hrs | 11550 | 13900 |  |  | 12300 |  | 12100 |
| Mechanical Properties |  |  |  |  |  |  |  |
| Elongation (%) | 810 | 885 |  |  | 880 |  | 790 |
| Tensile strength (gr/mm2) | 660 | 670 |  |  | 660 |  | 610 |

*β pinene

For the sake of comparison a series of polymerizations were carried out using similar conditions but omitting the piperylene concentrate and the results are given in Table 2.

TABLE 2

| Feed composition |  |  |  |  |  |
|---|---|---|---|---|---|
| Piperylene concentrate | 0 | 0 | 0 | 0 | 0 |
| α-pinene concetate | 31 | 31 | 40.7 | 80 | 31 |
| Styrene | 30 | 0 | 39.3 | 0 | 15 |
| Solvent | 39 | 69 | 20 | 20 | 54 |
| Resin Properties |  |  |  |  |  |
| Resin yield | 38.6 | 2.4 | 53.5 | 3.5 | 20.1 |
| Fill yield | 14.2 | 6.4 | 18.9 | 14.9 | 10.2 |
| Softening point (°C.) | 106 | 92 | 107 | 101 | 100 |
| Gardner colour | 1.5 | 8 | 1⁻ | 8 | 3 |
| Wax cloud point (°C.) |  |  |  |  |  |
| EVA 250/Resin/Wax 30/45/25 | 210 | — | 138 | 85 | 89 |
| Adhesive Properties |  |  |  |  |  |
| WCP (°C.) |  |  | 138 |  |  |
| Viscosity at 180° C. (cps) |  |  | 13400 |  |  |
| T-Peel (gr/cm) |  |  |  |  |  |
| on polyethylene |  |  | jerking |  |  |
| on Aluminium |  |  | 990 |  |  |

Also for the sake of comparison 6.0 wt. % of cyclopentadiene was added to Piperylene concentrate and the feed mixed with α-Pinene and styrene and polymerised as set out above.

The feed proportions and the properties of the resin obtained are set out below:

| Feed composition |  |
|---|---|
| Piperylene concentrate | 22.3 |
| α-pinene concentrate | 24.7 |

| -continued | |
|---|---|
| Styrene | 23.5 |
| Solvent | 23.5 |
| Cyclopentadiene | 6 |
| Resin Properties | |
| Resin yield | 60.5 |
| Fill yield | 9.2 |
| Softening point (°C.) | 112.5 |
| Wax cloud point (°C.) EVA 250/Resin/Wax 30/45/25 | Higher than 250 |
| Gardner Colour | 7.5 |

Showing the poorer compatibility in ethylene vinyl copolymer/wax blends and colour when the cyclopentadiene is present.

The adhesive properties of the resins of experiments 1, 2, 3 and 4 were tested in a hot melt pressure sensitive adhesive formulation containing a styrene/isoprene/styrene copolymer sold of Shell as Cariflex 1107 with the following results

| Experiment | 1 | 2 | 3 | 4 |
|---|---|---|---|---|
| 180° C. peel strength gr/cm | 1570 | 1075 | 990 | 880 |
| Loop Tack N/inch | 36 | 29 | 30 | 25 |
| Ball Tack cm | 4.5 | 2.5 | 2.5 | 3 |
| Polyken Tack gr | 1570 | 1265 | 1135 | 1220 |
| Hot Shear °C. (min) | 60/20 | 60/15 | 50/18 | 50/10 |
| Visc. at 175° C. (cps) | | 57000 | 51500 | 50500 |

EXAMPLE 2

A resin according to the present invention was obtained using alpha methyl styrene rather than styrene and the feeds used and properties of the resin were as follows:

| Feed composition | |
|---|---|
| Piperylene concentrate | 23.8 |
| α-pinene concentrate | 26.2 |
| Solvent | 25 |
| α-methyl styrene | 25 |
| Resin Properties | |
| Resin yield | 49.8 |
| Fill yield | 13.9 |
| Softening point (°C.) | 92 |
| Wax cloud point (°C.) EVA 250/Resin/Wax 30/45/25 | 84 |
| Gardner Colour | 3+ |

EXAMPLE 3

The process of Example 1 was repeated replacing a portion of the piperylene concentrate with a fluid catalytic cracking $C_5/C_6$ olefine concentrate containing 45 wt. % olefines and 55 wt. % saturates with the following results.

| Feed Composition | |
|---|---|
| Piperylene concentrate | 45 |
| Olefine concentrate | 30 |
| styrene | 5 |
| Alpha pinene | 20 |
| Resin Properties | |
| Styrene content (by NMR) | 8.3 |
| Resin yield | 47.8 |
| Fill yield | 12.9 |
| Softening point (°C.) | 93 |

| -continued | |
|---|---|
| WCP (°C.) | 90 |
| Gardner Colour | 3 |
| Pressure Sensitive Adhesive Properties | |
| Peel Strength | |
| (gr/cm) | 470 |
| (lb/inch) | 2.61 |
| Ball tack (cm) | 2 |
| Polyken Tack (gr) | 710 |
| Loop Tack (N/inch) | 15.5 |
| Shear (Hrs) | 80 |

EXAMPLE 4

The process of Example 1 was repeated using Limonene instead of alpha-pinene, the limonene used was 97% pure and the results were as follows.

| Feed Composition | | | | |
|---|---|---|---|---|
| Limonene | 26.2 | 26.2 | 33.8 | 33.5 |
| Piperylene | 8.8 | | | 11.5 |
| Styrene | 30 | 30 | 20 | |
| α-methyl styrene | | | | 20 |
| $C_5$ olefines | | 8.8 | 11.2 | |
| Xylene | 35 | 35 | 35 | 35 |

| Resin Properties | | | | |
|---|---|---|---|---|
| Styrene in resin (NMR) | | | | |
| $\overline{M}n$ | 650 | 600 | 580 | 600 |
| $\overline{M}w$ | 2560 | 1810 | 1630 | 1962 |
| Mw/Mn | 3.94 | 3.02 | 2.81 | 3.27 |
| Resin yield | 58.5 | 53 | 49.1 | 49.7 |
| Fill yield | 9.9 | 17.2 | 19.1 | 18.9 |
| Softening point (°C.) | 101 | 97 | 104 | 107 |
| Colour Gardner | 1.5 | 1.5 | 1.5 | 2+ |
| Wax Cloud Point (°C.) | 88 | 88 | 89 | 88 |
| Heat stability | | | | |
| 150° C., 3 hrs | 3— | 3 | | |
| 150° C., 16 hrs | 6— | 5.5 | | |
| 175° C., 5 hrs | 6 | 5.5 | | |

| Hot Melt Adhesive Properties | | | | |
|---|---|---|---|---|
| (°C.) Wax Cloud Point °C. | 65 | 65 | 60 | 60 |
| Viscosity at 180° C. (cps) | | 13500 | 14300 | 14300 |
| T-peel (gr/cm) | | | | |
| on polyethylene | Between 50 and 270 | 390 | 450 | 340 |
| on aluminium | 950 | 1160 | 1110 | 1030 |
| Heat stability at 180° C. | | | | |
| 2 hrs | 3 | 3 | 4 | 4 |
| 25 hrs | 7 | 7 | 8 | 8 |
| 50 hrs | 12 | 11 | 14 | 14 |
| Viscosity after 50 hrs | | 13300 | 12900 | 13600 |
| Skinning | | | | |
| 2 hrs | 0 | 0 | 0 | 0 |
| 25 hrs | 0 | 0 | 0 | 0 |
| 50 hrs | 0 | 0 | 0 | 40 |
| Elongation (%) | | 770 | | |
| Tensile strength (gr/mm²) | | 670 | | |

We claim:

1. A hot melt adhesive comprising:
   (i) an ethylene vinyl acetate copolymer;
   (ii) wax; and
   (iii) a resin consisting essentially of a copolymer containing from 5 to 80 wt. % units derived from an olefinically unsaturated aromatic compound, from 5 to 80 wt. % units derived from $C_5$ olefins or diolefines or $C_6$ olefines or diolefines or a mixture thereof, and from 7 to 45 wt. % units derived from a terpene.

2. The hot melt adhesive of claim 1 wherein said resin has a softening point of from about 60° C. to about 120° C.

3. The hot melt adhesive of claim 2 wherein said resin has a softening point of from about 75° C. to about 115° C.

4. The hot melt adhesive of claim 3 wherein said resin has a softening point of from about 90° C. to about 105° C.

5. The hot melt adhesive of claim 1 wherein the olefinically unsaturated aromatic compound of said resin is styrene.

6. The hot melt adhesive of claim 1 wherein said resin is substantially free from cyclopentadiene and dicyclopentadiene.

7. The hot melt adhesive of claim 6 wherein said resin contains less than 2 wt. % cyclopentadiene or dicyclopentadiene.

8. The hot melt adhesive of claim 1 wherein said resin has a molecular weight of from about 500 to about 1500.

9. The hot melt adhesive of claim 1 wherein said resin has a Gardner color of about 4 or less.

10. The hot melt adhesive of claim 1 wherein said resin contains alpha-pinene as the terpene.

11. The hot melt adhesive of claim 1 wherein said resin contains carene as the terpene.

12. The hot melt adhesive of claim 1 wherein said resin contains limonene as the terpene.

13. The hot melt adhesive of claim 1 wherein said resin also contains units derived from a chain transfer agent.

* * * * *